United States Patent
Verma

(10) Patent No.: US 12,417,233 B2
(45) Date of Patent: Sep. 16, 2025

(54) MULTITENANCY IN EXTRACT, TRANSFORM, LOAD (ETL) PIPELINE ORCHESTRATION TOOLS

(71) Applicant: INTUIT INC., Mountain View, CA (US)

(72) Inventor: Khilawar Verma, Santa Clara, CA (US)

(73) Assignee: INTUIT INC., Mountain View, CA (US)

( * ) Notice: Subject to any disclaimer, the term of this patent is extended or adjusted under 35 U.S.C. 154(b) by 393 days.

(21) Appl. No.: 17/538,918

(22) Filed: Nov. 30, 2021

(65) Prior Publication Data

US 2023/0169085 A1 Jun. 1, 2023

(51) Int. Cl.
 *G06F 16/25* (2019.01)
 *G06F 21/45* (2013.01)

(52) U.S. Cl.
 CPC ............ *G06F 16/254* (2019.01); *G06F 21/45* (2013.01); *G06F 2221/2137* (2013.01)

(58) Field of Classification Search
 CPC ................... G06F 16/254; G06F 21/45; G06F 2221/2137; G06F 21/6218
 See application file for complete search history.

(56) References Cited

U.S. PATENT DOCUMENTS

| | | | |
|---|---|---|---|
| 9,946,725 B1* | 4/2018 | Saviano | G06F 21/6218 |
| 10,715,524 B1* | 7/2020 | Paulus | H04L 63/0846 |
| 11,003,645 B1* | 5/2021 | Thompson | G06F 16/26 |
| 2003/0120593 A1* | 6/2003 | Bansal | H04L 65/765 |
| | | | 705/36 R |
| 2004/0010721 A1* | 1/2004 | Kirovski | G06F 21/36 |
| | | | 726/19 |
| 2009/0164579 A1* | 6/2009 | Chaudhry | H04N 21/4334 |
| | | | 709/205 |
| 2015/0341167 A1* | 11/2015 | Gregory | G06F 13/36 |
| | | | 380/281 |
| 2016/0019132 A1* | 1/2016 | Vilakkumadathil | |
| | | | G06F 11/3612 |
| | | | 717/126 |
| 2022/0038445 A1* | 2/2022 | LeClair | H04L 63/083 |
| 2022/0318194 A1* | 10/2022 | Ireifej | G06F 16/254 |

\* cited by examiner

*Primary Examiner* — Charles D Adams
(74) *Attorney, Agent, or Firm* — Patterson + Sheridan, LLP

(57) ABSTRACT

Certain aspects of the present disclosure provide techniques for multitenancy pipeline orchestration. According to certain embodiments, a user stores user code in a code repository and defines user code permissions needed to execute the code in an ETL system, that are stored in a database on a processing platform. The user code is imported to the ETL environment, and a plugin obtains the user code permissions from the processing platforms and generates a DAG having an operational context that includes the user code and user code permissions, that govern access permissions during execution on an ETL engine. When execution of the DAG ceases, the user code and user code permissions are removed from the ETL system, according to certain embodiments.

15 Claims, 6 Drawing Sheets

MULTITENANCY IN EXTRACT, TRANSFORM, LOAD (ETL) PIPELINE ORCHESTRATION TOOLS

INTRODUCTION

Aspects of the present disclosure relate to multitenant environments, and more particularly to determining operational permissions for a tenant in a multitenant extract, transform, load (ETL) environment.

Extract, transform, and load (ETL) processes schedule and orchestrate access to data sources by multiple user code bases. User code bases may be represented as directed acyclic graphs (DAGs) which visually diagrams the operations of an ETL instance. For a given DAG, user code represents a node in a graph, input arrows into the node represent dependencies of the code associated with that node, and the results generated by the user code are carried forward (e.g., as an input into another node). The DAG representing user code may thus be a graph that is directed and acyclic, as the output of the DAG may not serve as input into the same DAG, and each vertex between nodes in the DAG may have a directionality (e.g., indicating that the output of a node is an input or dependency of another node). Multiple DAGs may be executed in an instance of an ETL process, with the instance of the ETL process providing functionality of scheduling and orchestration of their execution in access to one or more data sources, also called data warehouses, data lakes, and the like. Further, the instance of the ETL process manages resources in a computing environment, spinning up additional compute resources as needed for operation of the multiple DAGs. To manage resources for the execution of DAGs in the computing environment, the instance of the ETL process has a permission role in the computing environment for obtaining and releasing computing resources.

Within the instance of the ETL process, a default identity and access management (IAM) role generally governs operation of the various DAGs, enabling the DAGs to access compute resources (e.g., memory resources, processing resources, etc.) as well as other DAGs. However, because there are generally a limited number of default IAM modes that provide access context across a universe of DAGs, managing multiple DAGs becomes challenging. For example, a default IAM permissions role that allows for access to all DAGs in the instance of the ETL process can result in unintended access to compute resources, as one DAG can access the resources of another DAG. In response, ETL administrators may spin up multiple instances of the ETL process, but this increases complexity as a DAG in one instance of the ETL process may require access to a DAG in another instance of the ETL process, even though the compute resources for one ETL process may be isolated from the compute resources for another ETL process (e.g., inaccessible to other ETL processes). Moreover, acquiring additional CPU, memory, network, load balancers, and other resources for provisioning multiple instances of the ETL process increases cost and operational complexity with each additional instance of the ETL process.

Thus, what is needed are systems and methods for providing individual internal IAM role permissions for individual DAGs in an ETL instance.

BRIEF SUMMARY

Certain embodiments provide a method for executing code in a multitenant extract, transform, load (ETL) environment. The method generally includes receiving user code at the ETL environment, the ETL environment being configured with an ETL permissions role. User code is executed in the ETL environment. Executing the user code in the ETL environment generally includes receiving a user code permissions role, generating a context based on the user code permissions role, and executing the user code in the ETL environment based on the context.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

Certain embodiments provide for a system for provisioning a multitenant extract, transform, and load (ETL) environment, which includes a memory comprising computer-readable instructions, and a processor configured to execute the computer-readable instructions. The computer-readable instructions cause the system to generate a reference to user code associated with a user account, create a pipeline comprising a user code permission associated with the user code, provide the pipeline and the reference to user code, responsive to a first request from an ETL environment, and receive request for validation of user code permissions associated with the user code, responsive to a validation request from the ETL environment.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
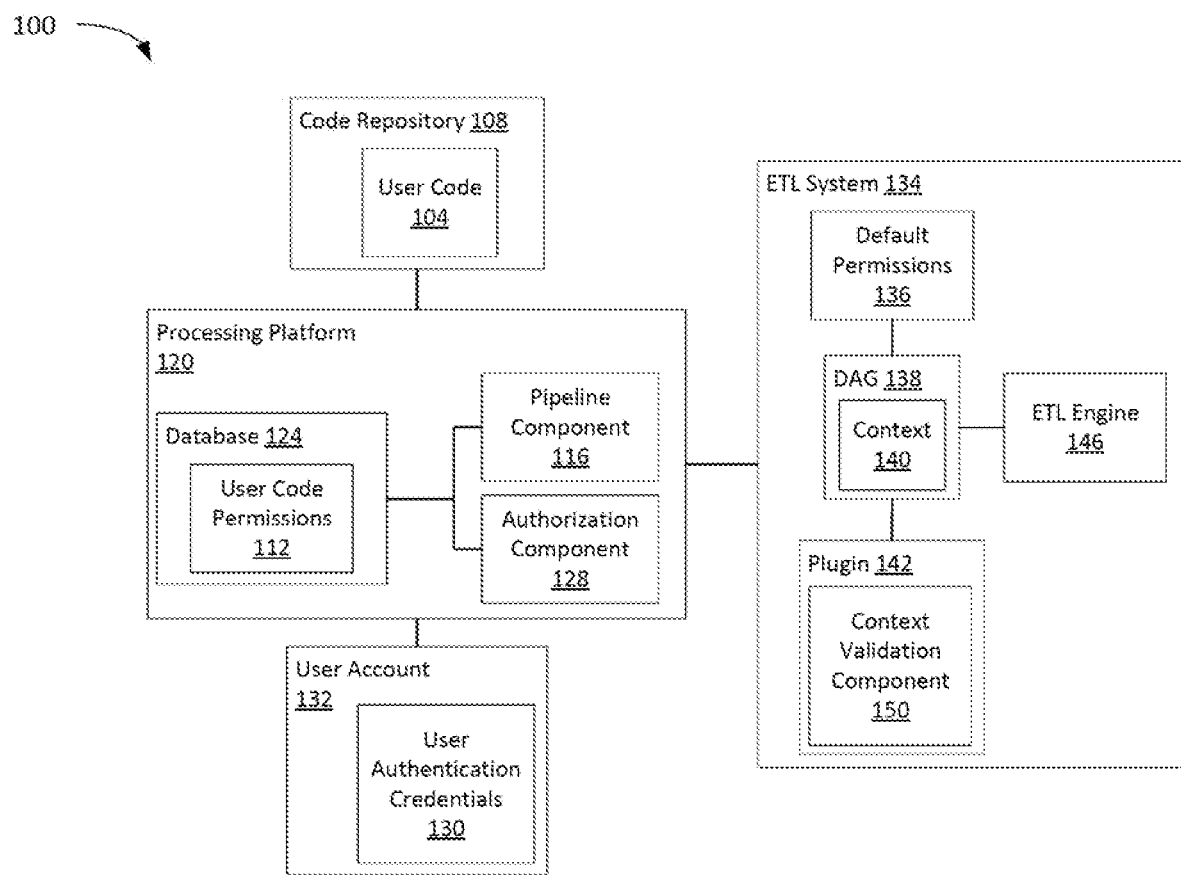
FIG. 1 depicts a system for multitenancy extract, transform, load (ETL) pipeline orchestration, according to certain embodiments.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure provide apparatuses, methods, processing systems, and computer-readable mediums for multitenancy pipeline orchestration tools for ETL systems. According to certain embodiments, when a user creates code in a code repository, the user creates a set of permissions needed for the user code to run in an ETL system. The user code, also referred to as a directed acyclic graph (DAG) herein is stored in a code repository, and permissions are stored in a database.

Within an instance of an ETL process (also referred to as an "ETL instance"), a plugin is provided to obtain and manage the IAM role permissions of individual DAGs. A user logs into the ETL instance and imports code from the code repository, invoking the plugin to retrieve the permissions for the DAG, that are embedded in the DAG at execution time. The embedded permissions generally provide an operational context for the DAG during execution, preventing access and operations not provided in the permissions either to ETL resources or to other DAGs operating in the ETL instance.

By providing discrete permissions for individual DAGs, the ETL instance becomes a multitenant environment in which multiple DAGs can be executed, with each DAG being governed by its associated permissions. In this context, a multitenant environment is a computing environment in which each operating instance of user code, or DAG, has unique operational permissions governing access to other DAGs or compute resources available in the ETL instance. The techniques discussed herein may, thus, allow DAGs for an organization requiring access to each other and/or common data and compute resources to be executed in a single multitenant ETL instance. By operating multiple DAGs according to principles of systems and methods disclosed herein, CPU time, memory, power, network bandwidth, and other resources may be saved by operating these DAGs in a single ETL multitenant instance, instead of multiple ETL instances in which default IAM roles provide access context for the DAGs executing within each of the multiple ETL instances. Further, security issues in ETL instances using default IAM roles may be remedied by providing a multitenant ETL for multiple DAGs, with each DAG having defined operational permissions preventing access to resources (e.g., compute resources and other DAGs) that are not included in the permissions of the DAG. Moreover, by operating multiple DAGs in a single instance, security issues caused by the need to have multiple ETL instances, and networks connecting the multiple instances, needed for a DAG requiring access to DAG in a different instance.

Example System for Multitenancy Extract, Transform, Load (ETL) Pipeline Orchestration FIG. 1 depicts a system 100 for multitenancy extract, transform, load (ETL) pipeline orchestration, according to certain embodiments. As discussed herein, an ETL pipeline generally refers to a process by which user code defines a process by which data is extracted from a data source, processed, and loaded into a destination system (e.g., represented by another artifact of user code). ETL pipelines within system 100 may be defined, for example, for multiple artifacts of user code, and each artifact of user code 104 may be associated with a set of permissions to be used in executing the user code defining or otherwise associated with an ETL pipeline. These ETL pipelines, with the associated sets of permissions, may allow for an ETL system to become a multitenant environment so that a reduced number of ETL process instances are needed to execute different user code artifacts. The permissions may allow user code artifacts for ETL pipelines, for example, to interact with other user code artifacts while blocking the user code artifacts from interacting with other artifacts for which permission has not been granted. Thus, multiple user code artifacts may execute within a single ETL process while maintaining data security within the ETL process and minimizing the amount of compute resources dedicated to executing user code in an ETL environment.

A user develops user code 104 and stores the user code in a code repository 108. Generally, the user code 104 may be a code artifact that defines a process for extracting data from a data repository, processing the data (e.g., transforming the extracted data from one format to another format), and loading the processed data into another process. Associated with the user code 104, the user creates user code permissions 112 required to execute the user code in the pipeline component 116 of a processing platform 120, and the user code permissions 112 are stored in a database 124. Generally, the user code permissions 112 associated with the user code 104 may define the permissions that user code 104 has with respect to other user code artifacts executing within ETL system 134. By way of example and not limitation using AIVIAZON™ AWS™ computing environments, user code permissions 112 may be a permission to access a computing resource such as a particular EC2™ instance, LAMBDA™ instance, S3™ instance, SAGEMAKER™ instance, or other computing instance or environment, or other user code embodied in a DAG discussed below. According to certain embodiments, user code permissions 112 includes a user ID of the creator and a unique identifier, that may be created based on the user code 104 file name or other aspect of the user code 104. The unique identifier may be a hash of the file name or other aspect of the user code 104. Further, upon creation of user code permissions 112, an authorization component 128 may provide the unique identifier in the form of a user credential related to a user account 132 of the user.

System 100 further includes an ETL system 134. According to certain embodiments, ETL system 134 may be one of AIRFLOW™, AIRBYTE™, FIVETRAN™, STITCH™, MATILLION™, SINGER™, or other ETL systems. DAG 138 includes user code 104, which in some embodiments is imported from code repository 108, and user code permissions 112, provided by a plugin 142, that make up a context 140.

ETL system 134, by way of example, may be utilized by computing environments having separate transaction database systems and data warehouses. ETL systems such as ETL system 134 extract, transform, and load data from a variety of sources (e.g., transaction databases, data warehouses) and update relevant data sources, based on user code embodied in DAGs. In this context, an ETL system schedules operation of user code, and orchestrates execution of user code based on dependencies in user code upon other user code, data sources, and transactions occurring in other systems. Conventionally, ETL system 134 has an ETL permissions role that provides the ETL system 134 with permissions in the context of a computing environment to allocate and deallocate computing resources, by way of example using AWS™, these resources may include and are not limited to EC2™, S3™, LAMBDA™, SAGEMAKER™, and other available resources. ETL system 134 includes default permissions 136 that may in some embodiments provide an operational context for one or more DAGs. User code permissions 112 incorporated into a DAG as described herein replace, or operate in addition to, the default DAG permissions.

When user code 104 is uploaded to DAG 138, plugin 142 makes an application program interface (API) call to the processing platform 120 for user authentication credentials 130 related to user code 104. Based on the user authentication credentials 130 and file name, user code permissions are provided to the plugin 142. The user code permissions are integrated into the DAG 138 as the context 140, for execution on the ETL engine 146. According to certain embodiments, context validation component 150 validates that the user code permissions 112 are the correct permissions for use with user code 104 embodied in the DAG 138 by verifying the unique identifier, validating the user authentication credentials 130 with an API call to the authorization component 128, that validates the user authentication credentials 130 with the user account 132. According to certain embodiments, context validating component 150 may use the unique identifier associated with the user code permissions 112 and related user ID to validate the user code permissions 112 against user code. Validating the user code permissions 112 prevents user code from a different user from utilizing the permissions associated with user code 104, preventing potential security issues that may arise from these different users interacting with user code 104 and the data associated with or processed by user code 104.

Example Process

Figure 2:
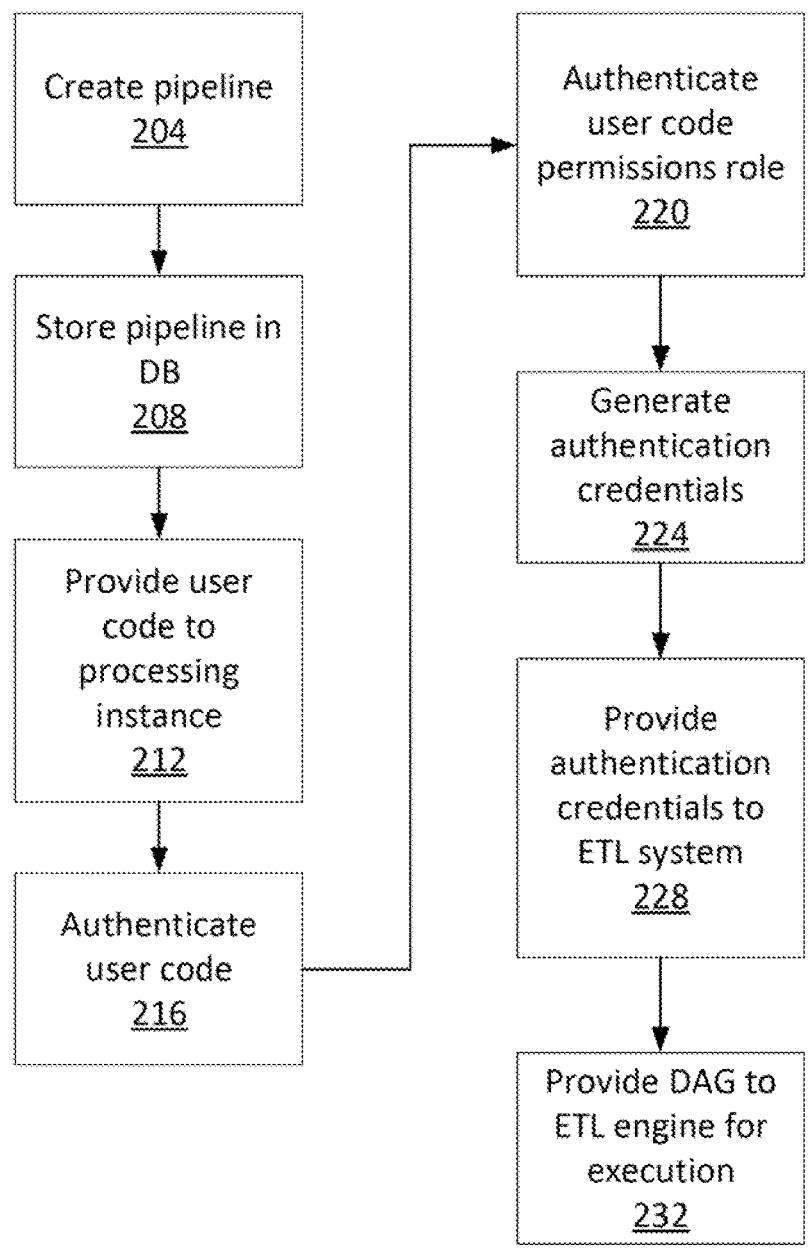
FIG. 2 depicts a process for multitenancy ETL pipeline orchestration, according to certain embodiments.

FIG. 2 depicts a process 200, according to certain embodiments. At block 204 a pipeline is created at the pipeline component. The pipeline created at the pipeline component generally implements user code permissions, such as user code permission 112 illustrated in FIG. 1, for a user executing code within an ETL system 134. As discussed, user code permission 112 is generally developed by a user and is associated with user code 104, and user code permission 112 generally defines permissions for user code 104 (e.g., with respect to systems or other user code with which the user code 104 is allowed to interact and with which the user code 104 is prohibited from interacting) when embodied in DAG 138 in the ETL system 134.

When the user code permission 112 are provided as part of DAG 138, ETL system 134 can apply the user code permissions 112 provided as part of DAG 138 instead of a default set of permissions defined for the ETL system 134. That is, the DAG 138 is limited in access and execution (e.g., interaction with other systems and/or user code) by the user code permissions 112. By limiting the permissions of the DAG 138 implementing user code 104, DAG 138 may be isolated from DAGs associated with unrelated user code (e.g., user code developed by other users of ETL system 134) and thus may not access resources to which the user code 104 ordinarily would not have rights to access and should not have rights to access. Further, by providing multiple DAGs 138 with unique user code permission, ETL system 134 may operate as a multitenant environment in which each DAG is limited in execution by its code permissions, enabling multiple DAGs to be securely, independently scheduled, and orchestrated within the ETL engine 146.

At block 208, the user code permissions, and related user ID, and in some embodiments, user credentials, and a unique identifier, are stored in database 124.

At block 212, user code 104 is provided to the instance of ETL system 134. Plugin 142 is invoked to retrieve user code permissions 112 to incorporate the user code 104 into DAG 138. At block 216, the user code 104 is authenticated with the authorization component 128 based on the user authentication credentials 130 of the user account 132.

At block 220, user code permissions 112 are validated by the context validation component 150. Using the user code permissions 112 and associated user ID, and in some embodiments user authentication credentials 130, from database 124, user code permissions 112 is validated against user authentication credentials 130 of the user account 132. Upon validation, at block 224 authentication credentials are generated for the user code permissions 112 in the plugin 142, that are provided to the ETL system 134, enabling integration of the user code 104 and user code permissions 112 to form DAG 138. At block 228, the authentication credentials are provided to the ETL system 134. At block 232, the DAG 138, including user code 104 and user code permissions 112, are provided to the ETL engine 146 by the ETL system 134 for execution. As discussed, because the ETL engine 146 is provisioned with the DAG 138 including user code 104 and user permissions 112, the ETL engine 146 can execute the DAG to perform an ETL process while maintaining the isolation of the ETL process for user code 104 from unrelated ETL processes and/or other computing resources.

Example Timing Diagram for Executing User Code in an ETL System

Figure 3:
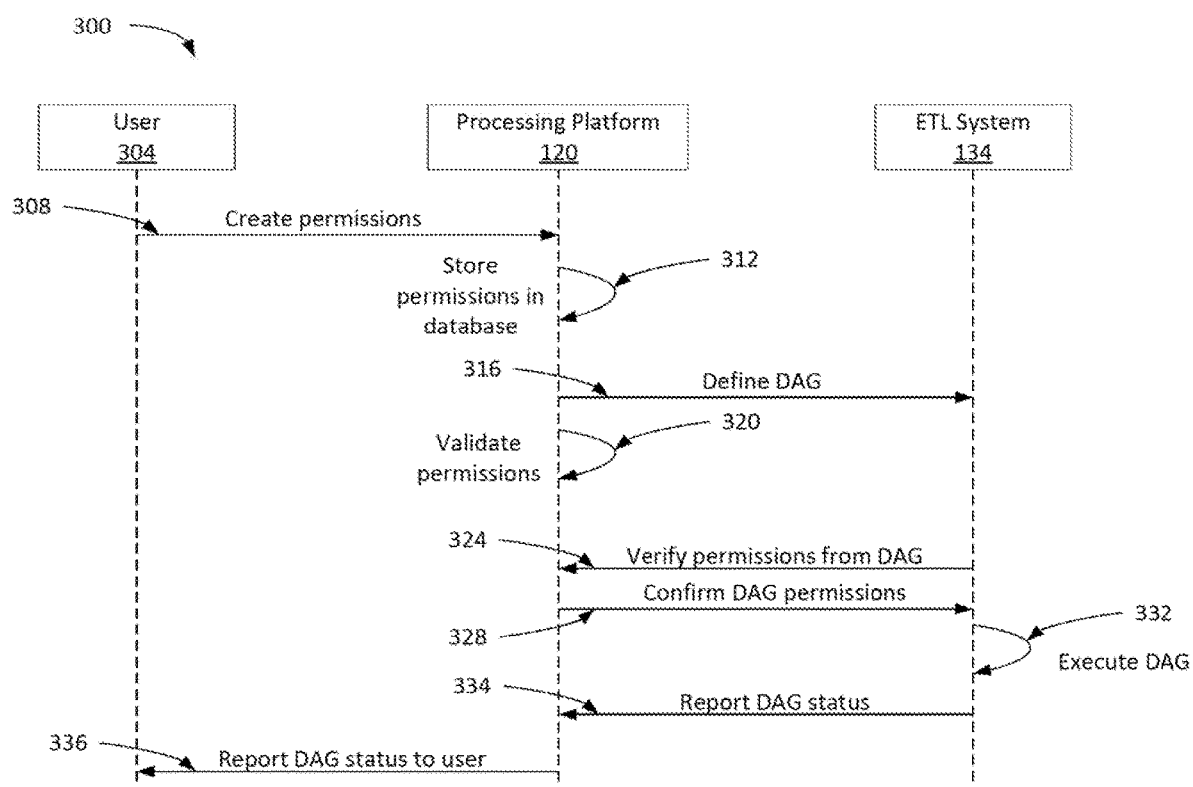
FIG. 3 depicts a timing diagram for multitenancy ETL pipeline orchestration, according to certain embodiments.

FIG. 3 depicts a timing diagram 300, according to certain embodiments. At arrow 308, a user 304 creates user code permissions 112 needed by user code 104 to cause the ETL system 134 to execute the DAG 138 based on the user code 104 and user code permissions 112 as a tenant of a multi-tenant environment. Generally, the user code permissions 112 generally define systems and user code artifacts with which user code 104 is permitted to interact. For example, the permissions may indicate that user code 104 is allowed to interact with other user code or other systems owned by the user associated with user code 104, but may not be allowed to interact with user code or other systems owned by some other user. In another example, the permissions may indicate that user code 104 is allowed to interact with user code or systems owned by the user associated with user code 104 or other users in a defined list of users. The permissions may indicate user code and systems that user code 104 is allowed to interact with, and it may be understood, when ETL system 134 generates a DAG for the user code 104, that the user code 104 is blocked from interacting with user code or systems not identified (explicitly or implicitly) in the associated user code permissions 112.

At arrow 312, the user code permissions 112 are stored in the database 124, in addition to the user ID, a unique name associated with the user code permissions, and in some embodiments, user authentication credentials 130 associated with the user ID.

At arrow 316, DAG 138 is defined in the ETL system. In this context, the DAG 138 is defined by the user code 104 and user code permissions 112. Generally, DAG 138 implements a process defined by the user code 104 for extracting data from one or more data sources, performing one or more transformations on the data, and outputting the transformed data for use by one or more other DAGs or other systems.

At arrow 320, the plugin 142 validates the user code permissions as being associated with the user code 104 by context validation component 150, as described above.

At arrow 324, one of the user ID, permissions code unique identifier, or user credential are provided to the processing platform 120 for validation against the database 124 record associated with user code 104 embodied in the DAG 138. At arrow 328, an affirmative validation message is received from the processing platform 120 based on validating the provided information against the database 124 record associated with user code 104, indicating permission to proceed. Generally, permission to proceed may be received if the provided information matches information included in user code permissions 112 (e.g., information provided about a user to processing platform is also included in user code permissions 112). When permission to proceed is received from ETL system 134, the DAG is executed in the ETL engine 146 of the ETL system 134. If an affirmative validation message is not received from the processing platform 120, execution of the DAG 138 does not proceed, as the user may not have rights or permission to execute the DAG 138 embodying user code 104 (e.g., because the user code 104 is owned by a different user and this different user has not granted permissions.

At arrow 332, the DAG 138 is executed by the ETL engine. When execution is complete, the DAG 138, in addition to the associated user code 104 and user code permissions 112, are deleted from the ETL system 134.

At arrow 334, status of the execution, or deletion, of the DAG 138 is transmitted to the processing platform 120 by the plugin 142 of the ETL system 134, and at arrow 336, the processing platform 120 transmits the status to the user 304.

Example Methods for Executing User Code in a Multitenant ETL Environment

Figure 4:
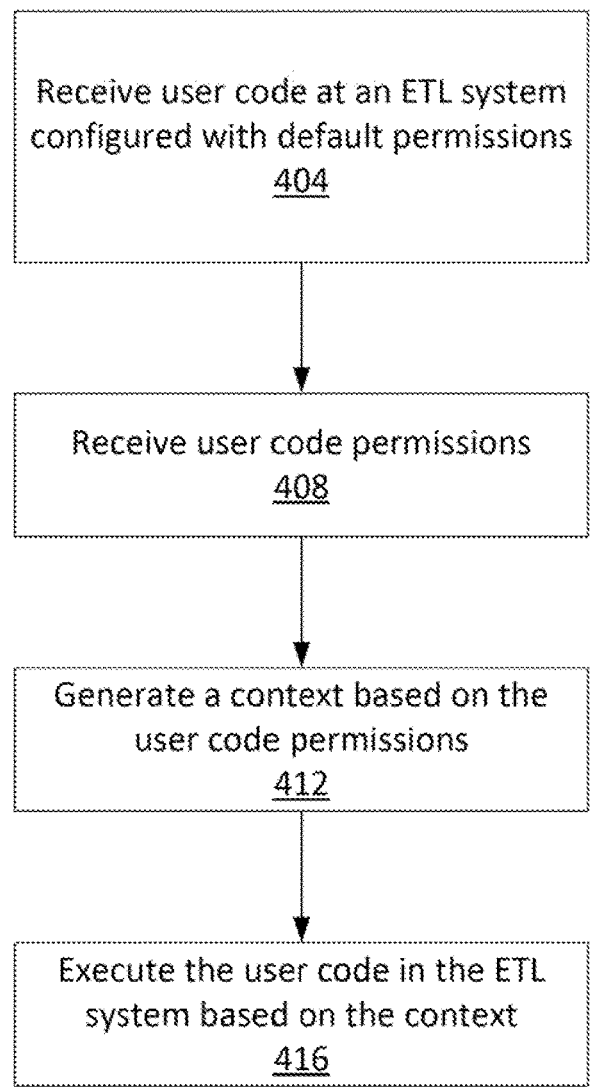
FIG. 4 depicts an example method for executing user code in a multitenant ETL environment, according to certain embodiments.

FIG. 4 depicts an example method 400 for executing user code in a multitenant extract, transform, load (ETL) environment, according to certain embodiments.

At block 404, the ETL system 134 receives the user code 104. According to certain embodiments, the ETL system 134 is configured with default permissions 136, and executing the user code in the ETL system 134.

At block 408, the executing includes receiving user code permissions 112 from the processing platform 120. According to certain embodiments, user code permissions are generated based on a code file associated with the user code, the code file having a code file name. According to certain embodiments, the user code comprises a user code name, and the method further comprises validating the context at least in part by receiving an indication that the user code name is the same as the code file name.

At block 412, the ETL system 134 generates, via plugin 142, a context 140 based on the user code permissions 112. According to certain embodiments, generating the context further comprises receiving user authentication credentials. According to certain embodiments, receiving the user credentials comprises receiving the user authentication credentials from a database row identified with a hash based on the user authentication credentials and the code file name At block 416 ETL system 134 executes the user code 104 in the ETL system 134 based on the context 140. According to certain embodiments, executing the user code in the ETL system comprises generating a connection with the ETL system and providing three user code and validated context to the ETL system.

According to certain embodiments, the method further comprises generating a user code authentication token based on the user authentication credentials, the user code authentication token comprising an expiration time.

Note that FIG. 4 is just one example of a method, and other methods including fewer, additional, or alternative steps are possible consistent with this disclosure.

Example Methods for Provisioning a Multitenant ETL Environment

Figure 5:
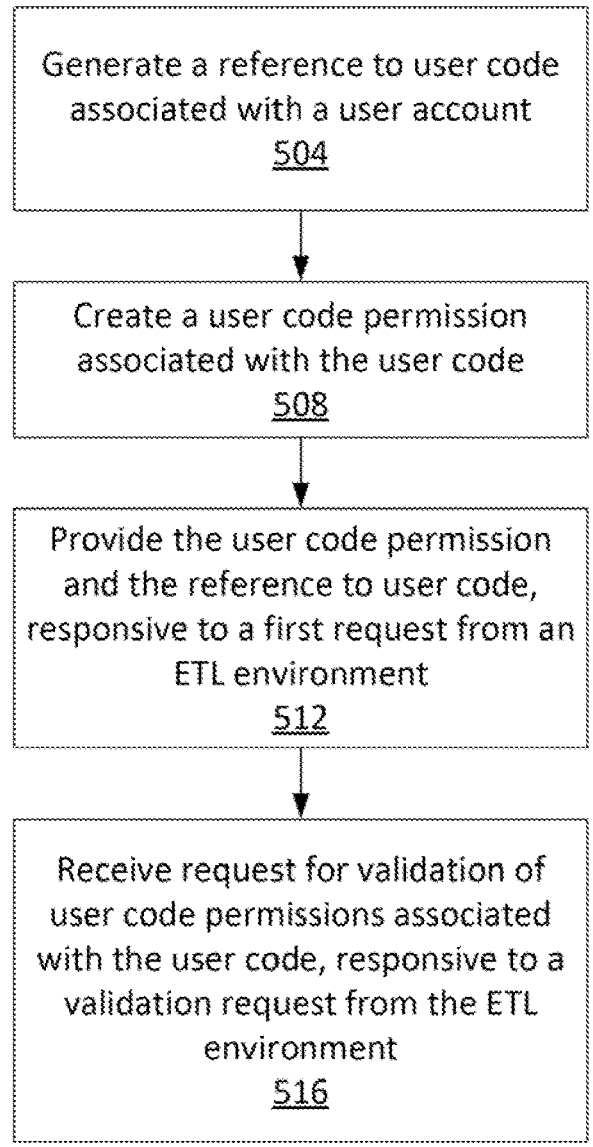
FIG. 5 depicts an example method for provisioning a multitenant ETL environment, according to certain embodiments.

FIG. 5 depicts an example method 500 for provisioning a multitenant ETL environment, according to certain embodiments. At block 504, the processing platform 120 generates a reference to user code associated with a user account.

At block 508, the processing platform 120 creates a user code permission associated with the user code.

At block 512, the processing platform 120 provides the user code permission and the reference to user code, responsive to a first request from an ETL system 134.

At block 516, the processing platform 120 receives request for validation of user code permissions associated with the user code, responsive to a validation request from the ETL system 134.

According to certain embodiments, the processing platform 120 receives an authentication request from the ETL system 134, generates user authentication credentials associated with the user account, and provides the user authentication credentials to the ETL system, responsive to the authentication request. According to certain embodiments, a context 140 is generated at the ETL system 134 based on the user code and user code permissions. According to certain embodiments, the user code is executed at the ETL system 134 based on the context 140.

According to certain embodiments, the processing platform 120 generates a unique name for the user code permission, and stores the user code permission such that the user code permission is indexed based on the unique name.

According to certain embodiments, the processing platform 120 receives a validation request for a second user code name based on the unique name, compares the second user code name to the unique name, and validates the second user code name responsive to the second user code name being different than the unique name.

Figure 6:
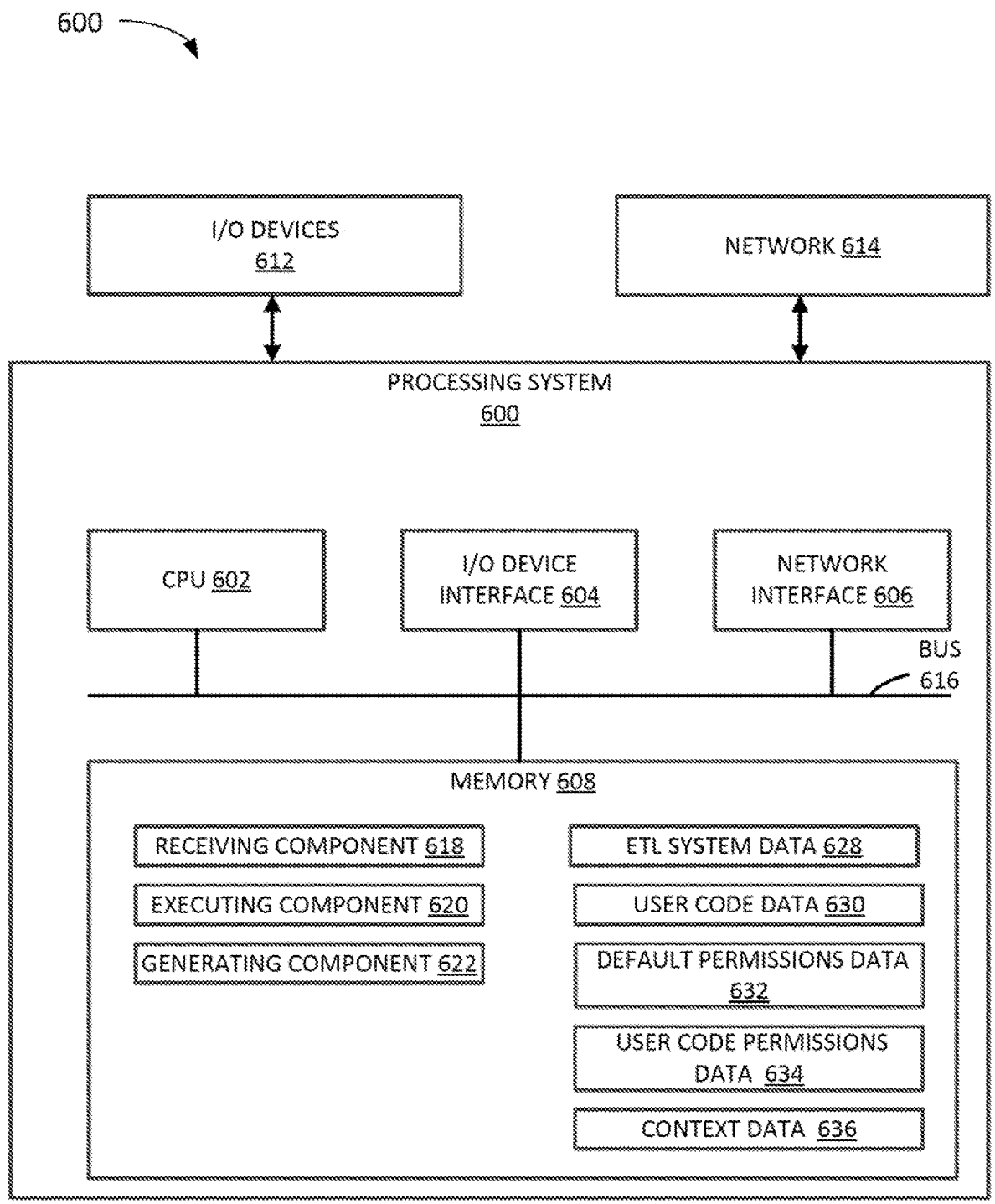
FIG. 6 depicts an example processing system on which embodiments of the present disclosure can be performed.

Example Processing System for Provisioning and Executing User Code in a Multitenant ETL Environment FIG. 6 depicts an example processing system 600, according to certain embodiments that may perform methods described herein, such as the method for orchestrating a multitenant ETL environment described with respect to FIGS. 3-5.

Processing system 600 includes a central processing unit (CPU) 602 connected to a data bus 616. CPU 602 is configured to process computer-executable instructions, e.g., stored in memory 608, and to cause the processing system 600 to perform methods described herein, for example, with respect to FIGS. 3-5. CPU 602 is included to be representative of a single CPU, multiple CPUs, a single CPU having multiple processing cores, and other forms of processing architecture capable of executing computer-executable instructions. Memory 608 is included to be representative of one or more memory devices such as volatile memories, that may be a RAM, cache, or other short-term memory that may be implemented in hardware or emulated in software, one or more non-volatile memories such as a hard drive, solid state drive, or other long term memory that may be implemented in hardware or emulated in software, or a combination of volatile and non-volatile memories. Moreover, one or more memory devices that makeup memory 608 may be located remotely from processing system 600 and accessed via a network.

Processing system 600 further includes input/output (I/O) device(s) 612 and interfaces 604, which allows processing system 600 to interface with input/output devices 612, such as, for example, keyboards, displays, mouse devices, pen input, and other devices that allow for interaction with processing system 600. Note that processing system 600 may connect with external I/O devices through physical and wireless connections (e.g., an external display device).

Processing system 600 further includes a network interface 606, which provides processing system 600 with access to external network 614 and thereby external computing devices.

Processing system 600 further includes memory 608, which in this example includes a receiving component 618, an executing component 620, and a generating component 622, for performing operations described in FIGS. 3-5. Memory 608 further includes ETL system data 628, user code data 630, default permissions data 632, user code permissions image data 634, and context data 636, that may be used in performing operations described in FIGS. 3-5.

Note that while shown as a single memory 608 in FIG. 6 for simplicity, the various aspects stored in memory 608 may be stored in different physical memories, including memories remote from processing system 600, but all accessible by CPU 602 via internal data connections such as bus 616.

Note that FIG. 6 is just one example of a processing system, and other processing systems including fewer, additional, or alternative steps are possible consistent with this disclosure.

Example Clauses

Implementation examples are described in the following numbered clauses:

Clause 1: A method for a multitenant extract, transform, and load (ETL) environment system (ETL), comprising: receiving user code at the ETL system, the ETL system being configured with a default permissions; executing the user code in the ETL system, including: receiving user code permissions; generating a context based on the user code permissions; and executing the user code in the ETL system based on the context.

Clause 2: A method, wherein generating the context further comprises receiving user authentication credentials for performing a method in accordance with Clause 1.

Clause 3: A method, wherein the user code permissions are generated based on a code file associated with the user code, the code file having a code file name, for performing a method in accordance with any one of Clauses 1-2.

Clause 4: A method, wherein: the user code comprises a user code name, and the method further comprises validating the context at least in part by receiving an indication that the user code name is the same as the code file name, for performing a method in accordance with any one of Clauses 1-3.

Clause 5: A method, further comprising generating a user code authentication token based on the user authentication credentials, the user code authentication token comprising an expiration time, for performing a method in accordance with any one of Clauses 1-4.

Clause 6: A method, wherein executing the user code in the ETL system comprises: generating a connection with the ETL system; and providing the user code and validated context to the ETL system, for performing a method in accordance with any one of Clauses 1-5.

Clause 7: A method, wherein receiving user authentication credentials comprises receiving the user authentication credentials from a database row identified with a hash based on the user authentication credentials and the code file name, for performing a method in accordance with any one of Clauses 1-6.

Clause 8: A system for provisioning a multitenant extract, transform, and load (ETL) system, comprising: a memory comprising computer-readable instructions; a processor configured to execute the computer-readable instructions that cause the system to: generate a reference to user code associated with a user account; create a user code permission associated with the user code; provide the user code permission and the reference to user code, responsive to a first request from an ETL system; and receive request for validation of user code permissions associated with the user code, responsive to a validation request from the ETL system.

Clause 9: A system, wherein the computer-readable instructions further cause the processor to: receive an authentication request from the ETL system; generate user authentication credentials associated with the user account; and provide the user authentication credentials to the ETL system, responsive to the authentication request, to cause the system to perform a method in accordance with Clause 8.

Clause 10: A system, wherein the computer-readable instructions further cause the system to generate the context further comprises receiving user authentication credentials, to cause the system to perform a method in accordance with any one of Clauses 8-9.

Clause 11: A system, wherein the user code is executed at the ETL system based on the context, to cause the system to perform a method in accordance with any one of Clauses 8-10.

Clause 12: A system, wherein the computer-readable instructions further cause the processor to: generate a unique name for the user code permission; and store the user code permission such that the user code permission is indexed based on the unique name, to perform a method in accordance with any one of Clauses 8-11.

Clause 13: A system, wherein the computer-readable instructions further cause the processor to: receive a validation request for a second user code name based on the unique name; compare the second user code name to the unique name; and validate the second user code name responsive to the second user code name being different than the unique name, to perform a method in accordance with any one of Clauses 8-12.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for creating a multitenant extract, transform, and load instance, comprising:
    generating a unique identifier associated with a given directed acyclic graph (DAG) provided by a first tenant;
    embedding, by a processing platform, the unique identifier and permissions specified by the first tenant into the given DAG, wherein the permissions specify unique identifiers that are granted access to the given DAG and associated DAGs; and
    providing the given DAG to a single ETL instance, wherein the single ETL instance is configured to be securely accessed by multiple tenants based on:
        Granting a particular DAG associated with a second tenant access to the given DAG based on a corresponding unique identifier associated with the particular DAG matching a given unique identifier of the unique identifiers specified by the permissions embedded in the given DAG;
        granting a third DAG associated with the first tenant access to the given DAG based on the unique identifier embedded in the given DAG matching a corresponding unique identifier associated with the third DAG;
    Blocking the particular DAG from accessing a fourth DAG associated with a third tenant based on a particular unique identifier associated with the particular DAG not matching a unique identifier embedded in the fourth DAG or any of the unique identifiers specified by the permissions embedded in the fourth DAG;
        executing code within the given DAG, code within the particular DAG, and code within the third DAG based on the particular DAG and the third DAG having access to the given DAG.

2. The method of claim 1, further comprising:
    requesting, by the single ETL instance upon receiving a request from the particular DAG to access the given DAG, from the processing platform, an authentication token comprising the corresponding unique identifier associated with the particular DAG and an expiration time; and
    granting the particular DAG access to the given DAG based on:
        the corresponding unique identifier in the authentication token matching the corresponding unique identifier associated with the particular DAG or the given unique identifier of the unique identifiers specified by the permissions embedded in the given DAG; and
        the expiration time.

3. The method of claim 2, wherein the permissions specified by the first tenant are related to a code file associated with the given DAG, the code file having a code file name.

4. The method of claim 3, wherein:
the particular DAG comprises a DAG name, and
the method further comprises granting the particular DAG access to the given DAG at least in part based on receiving an indication that the DAG name is the same as the code file name.

5. The method of claim 4, wherein the particular DAG is executed in the single ETL instance based on:
generating a connection with the single ETL instance; and
providing the multitenant ETL instance with the particular DAG and information used to grant the particular DAG access.

6. The method of claim 5, further comprising receiving the information used to grant the particular DAG access from a database row identified with a hash based on the information used to grant the particular DAG access and the code file name.

7. A system for a multitenancy environment for an ETL instance, comprising:
a memory comprising computer-readable instructions;
a processor configured to execute the computer-readable instructions and cause the system to:
generate a unique identifier associated with a given directed acyclic graph (DAG) provided by a first tenant;
embed, by a processing platform, the unique identifier and permissions specified by the first tenant into the given DAG, wherein the permissions specify unique identifiers that are granted access to the given DAG and associated DAGs; and
provide the given DAG to a single ETL instance, wherein the single ETL instance is configured to be securely accessed by multiple tenants based on:
Granting a particular DAG associated with a second tenant access to the given DAG based on a corresponding unique identifier associated with the particular DAG matching a given unique identifier of the unique identifiers specified by the permissions embedded in the given DAG;
granting a third DAG associated with the first tenant access to the given DAG based on the unique identifier embedded in the given DAG matching a corresponding unique identifier associated with the third DAG;
Blocking the particular DAG from accessing a fourth DAG associated with a third tenant based on a particular unique identifier associated with the particular DAG not matching a unique identifier embedded in the fourth DAG or any of the unique identifiers specified by the permissions embedded in the fourth DAG;
executing code within the given DAG, code within the particular DAG, and code within the third DAG based on the particular DAG and the third DAG having access to the given DAG.

8. The system of claim 7, wherein the computer-readable instructions further cause the system to:
request, by the single ETL instance upon receiving a request from the particular DAG to access the given DAG, from the processing platform, an authentication token comprising the corresponding unique identifier associated with the particular DAG and an expiration time; and
grant the particular DAG access to the given DAG based on:
the corresponding unique identifier in the authentication token matching the corresponding unique identifier associated with the particular DAG or the given unique identifier of the unique identifiers specified by the permissions embedded in the given DAG; and
the expiration time.

9. The system of claim 8, wherein the permissions specified by the first tenant are related to a code file associated with the given DAG, the code file having a code file name.

10. The system of claim 9, wherein:
the particular DAG comprises a DAG name, and
the computer-readable instructions further cause the system to grant the particular DAG access to the given DAG at least in part based on receiving an indication that the DAG name is the same as the code file name.

11. The system of claim 10, wherein executing the particular DAG in the ETL instance causes the system to:
generate a connection with the ETL instance; and
provide the ETL instance with the particular DAG and information used to grant the particular DAG access to the ETL instance.

12. The system of claim 11, wherein the computer-readable instructions further cause the system to receive the information used to grant the particular DAG access from a database row identified with a hash based on the information used to grant the particular DAG access and the code file name.

13. A system for provisioning a multitenant extract, transform, and load (ETL) system comprising:
a memory comprising computer-readable instructions;
a processor configured to execute the computer-readable instructions that cause the system to:
generate a unique identifier associated with a given directed acyclic graph (DAG) provided by a first tenant;
embed, by a processing platform, the unique identifier and permissions specified by the first tenant into the given DAG, wherein the permissions specify unique identifiers that are granted access to the given DAG and associated DAG;
Providing the given DAG to a single ETL instance, wherein the single ETL instance is configured to be securely accessed by multiple tenants based on granting a particular DAG associated with a second tenant access to the given DAG based on:
a corresponding unique identifier associated with the particular DAG matching a given unique identifier of the unique identifiers specified by the permissions embedded in the given DAG;
receive a request from the particular DAG to access the given DAG;
request, by the ETL system upon receiving the request from the particular DAG, from the processing platform, an authentication token comprising the corresponding unique identifier associated with the particular DAG and an expiration time;
grant the particular DAG access to the given DAG based on:
the corresponding unique identifier in the authentication token matching the the given unique identifier of the unique identifiers specified by the permissions embedded in the given DAG; and
the expiration time
receive an additional request from the particular DAG to access a third DAG associated with a third tenant;
request, by the ETL system upon receiving the additional request from the particular DAG, from the processing platform, a second authentication token comprising a second unique identifier associated with the second user particular DAG;

block the particular DAG from accessing the third DAG based on the second unique identifier in the second authentication token not matching a unique identifier embedded in the third DAG or any of a set of unique identifiers specified by permissions embedded in the third DAG; and execute code within the given DAG and code within the particular DAG based on the particular DAG having access to the given DAG.

14. The system of claim 13, wherein the particular DAG is executed at the ETL system based on information used to grant the particular DAG access.

15. The system of claim 13, wherein the computer-readable instructions further cause the processor to:

generate a unique name for the permissions specified by the first tenant; and store the permissions specified by the first tenant such that the permissions specified by the first tenant are indexed based on the unique name.

\* \* \* \* \*